(12) United States Patent
Phuong et al.

(10) Patent No.: US 9,336,106 B2
(45) Date of Patent: May 10, 2016

(54) DYNAMICALLY LIMITING BIOS POST FOR EFFECTIVE POWER MANAGEMENT

(71) Applicant: Cisco Technology, Inc., San Jose, CA (US)

(72) Inventors: Scott Phuong, Sunnyvale, CA (US); Tao Wang, Cupertino, CA (US); Kumar Sidhartha, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 201 days.

(21) Appl. No.: 14/255,208

(22) Filed: Apr. 17, 2014

(65) Prior Publication Data

US 2015/0301914 A1 Oct. 22, 2015

(51) Int. Cl.
*G06F 1/32* (2006.01)
*G06F 11/22* (2006.01)

(52) U.S. Cl.
CPC ............ *G06F 11/2284* (2013.01); *G06F 1/324* (2013.01); *G06F 1/3293* (2013.01)

(58) Field of Classification Search
None
See application file for complete search history.

(56) References Cited

U.S. PATENT DOCUMENTS

| | | | |
|---|---|---|---|
| 6,272,642 B2 | 8/2001 | Pole, II et al. | |
| 7,287,153 B1 | 10/2007 | Hamersley | |
| 7,363,356 B1 | 4/2008 | Rissmeyer et al. | |
| 7,739,548 B2 | 6/2010 | Goodrum et al. | |
| 8,230,245 B2 | 7/2012 | Khatri et al. | |
| 2009/0265564 A1* | 10/2009 | Clemo | G06F 1/3203 713/300 |
| 2011/0283286 A1 | 11/2011 | Wu et al. | |
| 2012/0054543 A1 | 3/2012 | Dreier | |
| 2012/0170548 A1 | 7/2012 | Rajagopalan et al. | |
| 2012/0265910 A1 | 10/2012 | Galles et al. | |
| 2013/0145180 A1 | 6/2013 | Branover et al. | |
| 2013/0151869 A1 | 6/2013 | Steinman et al. | |
| 2014/0359264 A1* | 12/2014 | Bhargava | G06F 9/4406 713/2 |
| 2015/0220134 A1* | 8/2015 | Zhou | G06F 1/189 713/320 |

* cited by examiner

*Primary Examiner* — Paul Yanchus, III

(74) *Attorney, Agent, or Firm* — Edell, Shapiro & Finnan, LLC

(57) ABSTRACT

Presented herein are methods for budgeting power during a power-on self-test (POST) sequence. A determination is made for one or more stages of a power-on-self-test sequence of a system, whether a power profile of a particular stage is greater than a power budget for that stage. The power profile specifies a maximum power consumption as determined by the characteristics of the system and the power budget specifies a power consumption currently allocated to the system. When the power profile is greater than the power budget for that stage, power consumption of the system during the power-on-self-test sequence is limited such that the system does not consume more power than specified by the power budget.

20 Claims, 9 Drawing Sheets

| P1 | P2 | P3 | P4 | P5 | P6 | P7 | P8 | P9 | P10 | P11 | P12 | P13 | P14 |
|---|---|---|---|---|---|---|---|---|---|---|---|---|---|
| 3.33 | 3.20 | 3.06 | 2.93 | 2.80 | 2.66 | 2.53 | 2.40 | 2.26 | 2.13 | 2.00 | 1.86 | 1.73 | 1.60 |
| 130W | 124W | 119W | 114W | 108W | 103W | 98W | 93W | 88W | 83W | 79W | 74W | 70W | 65W |

FIG.5

| P0 | P1 | P2 | P3 | P4 | P5 | P6 | P7 | P8 | P9 | P10 | P11 | P12 | P13 | P14 |
|---|---|---|---|---|---|---|---|---|---|---|---|---|---|---|
| 100 | 100 | 95.38 | 91.54 | 87.69 | 83.08 | 79.23 | 75.38 | 71.54 | 67.69 | 63.85 | 60.77 | 56.92 | 53.84 | 50 |

FIG.6

DYNAMICALLY LIMITING BIOS POST FOR EFFECTIVE POWER MANAGEMENT

TECHNICAL FIELD

The present disclosure relates to managing power consumption during a power-on-self-test (POST) sequence.

BACKGROUND

During a POST sequence, a server may reach maximum power consumption during power up of various hardware and software components of the server. The majority of power consumption is driven by hardware constraints (e.g., amount of power needed to perform various memory tests, amount of power needed to power up the processor, etc.). In configurations in which available power is distributed to multiple servers on a chassis, an unplanned reboot of a server on the chassis may exceed available power, and cause the power supply to the entire chassis to be turned off, thereby resulting in a temporary shutdown of all servers powered by the chassis.

BRIEF DESCRIPTION OF THE DRAWINGS

FIG. 5 is an example of a performance state table of a processor, according to an example embodiment.

FIG. 6 is an example of a normalized P-state table, according to an example embodiment.

DESCRIPTION OF EXAMPLE EMBODIMENTS

Overview

Figure 1:
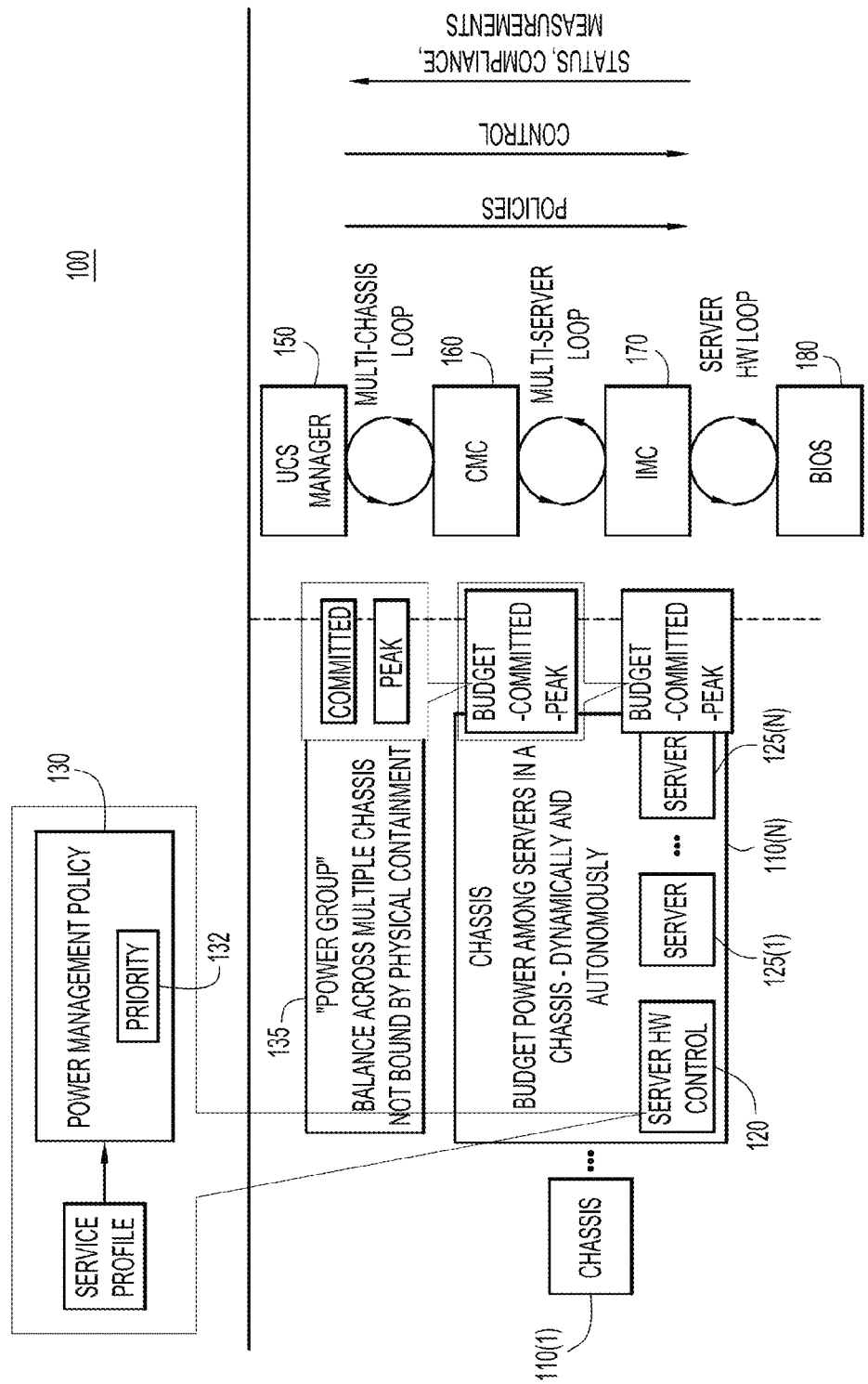
FIG. 1 is a block diagram showing software and hardware architecture used to perform power management, according to an example embodiment.

In accordance with example embodiments, techniques are presented for managing power during a power-on-self-test (POST) sequence. A determination is made for one or more stages of a power-on-self-test sequence of a system, whether a power profile of a particular stage is greater than a power budget for that stage. The power profile specifies a maximum power consumption as determined by the characteristics of the system and the power budget specifies a power consumption currently allocated to the system. When the power profile is greater than the power budget for that stage, power consumption of the system during the power-on-self-test sequence is limited (i.e., capped) such that the system does not consume more power than specified by the power budget.

Example Embodiments

In data center environments, a plurality of servers may be connected to a single chassis, which supplies power to each server. During normal boot up operations, a server progresses through a sequence of operations, in a process referred to as a power-on-self-test (POST), and may consume maximum power during the process of powering up various hardware and software components. Power consumption is mostly driven by hardware constraints (e.g., the amount of power needed to perform various memory tests, the amount of power needed to power up the processor, etc.), and accordingly, central processing unit (CPU) operating frequency may be a predominant factor contributing to power consumption. Simply placing an upper limit, or a ceiling, on the power consumption that the Basic Input/Output System (BIOS) is allowed to use may be suboptimal. Under such a configuration, the power limit would likely be too high, as the system would not need to constantly consume this amount of power, and therefore, this configuration would lead to underutilization of the power supply. Allocating additional power for POST operations may prevent a chassis from being fully populated. On the other hand, not constraining power consumption by a server during POST, may lead to an alternate set of challenges. For example, if an unplanned server reboot occurs, and power consumption during the reboot process exceeds available power (e.g., power not consumed by the other servers on the chassis), the entire chassis may be powered down due to insufficient power. In other words, in configurations in which available power is distributed to multiple servers on a chassis, an unplanned reboot of one of the servers on the chassis may exceed available power, causing a shutdown of all servers on the chassis.

The techniques presented herein provide for limiting power consumption during a BIOS POST sequence. Such techniques allow for power consumption of a server or a group of servers to be adjusted by varying the performance state (P-state) of a processor, ensuring that a server remains within a specified power budget. Accordingly, such techniques improve overall power efficiency by load balancing power distribution and maximizing the number of servers that may be powered on by a chassis in a power constrained environment. Such techniques do not require power reallocation, rather, power consumption is adjusted by altering the P-state of a CPU.

Referring to FIG. 1, a block diagram of a computing environment is shown for a power management system 100 including one or more chassis 110(1) . . . 110(N), a server hardware control manager 120, and a plurality of servers 125(1)-125(N). A power management policy 130 for each of the servers 125(1)-125(N), or any combination thereof, may be stored on the server hardware control manager 120 or on any device in communication with server hardware control manager 120. A power group 135 is also shown, which may include a plurality of the servers 125(1)-125(N) under the control of the server hardware control manager 120 on one or more chassis. Additionally, various software modules are shown at 150-180, including UCS Manager 150, a chassis management controller (CMC) 160 (which may run on server HW control manager 120), an Integrated Management Controller (IMC) 170 and a BIOS 180. Each of these components are described in additional detail below.

UCS Manager 150 may manage power distribution between multiple chassis or within a single chassis. UCS Manager derives a per chassis (or multiple chassis) power budget based upon a user assigned power budget for a power group 135. UCS manager 150 may deploy power budgets to CMC 160, and may obtain power statistics from CMC 160 (and, in some cases, directly from IMC 170) as part of a discovery and power profiling process, described herein with reference to FIGS. 3A and 3B below. For example, the UCS Manager may receive statistics, such as power consumption numbers of each server. UCS Manager 150 may also specify, to the CMC 160, a fixed power budget for a particular server in a power group.

CMC 160 manages power per chassis, that is, between multiple servers within its own chassis, based upon instructions (e.g., a power budget) from UCS Manager 150. Upon receiving a power budget from the UCS Manager, the CMC may deploy the budget to the IMC, for implementation on the server. The UCS Manager/CMC monitors the power consumption of the other blades/servers to determine how much power may be assigned to a particular blade/server. The CMC 160 decides how to divide available power among each server in a chassis.

IMC 170 monitors power consumption and provides power statistics to the CMC 160, which conveys the statistics to the UCS Manager 150. Additionally, IMC 170 adjusts the P-state of the server by sending instructions to BIOS 180 (as needed) to remain within a power budget, with the power budget specified by the UCS Manager/CMC. Thus, the IMC 170 in conjunction with the BIOS 180 sets the performance states of the server, and in doing so, controls power consumption to ensure compliance within the power budget. BIOS 180 implements requests from IMC 170 to adjust (as needed) power consumption by changing the P-state during POST. The IMC tracks the normalized P-state for a particular blade/server, and informs the BIOS to limit the blade/server boot-up power based upon a power budget from the UCS Manager/CMC, as needed. Power budget allocation may change dynamically based upon the power demands of each server. Based upon this information, the IMC determines a current power consumption in view of the current budget, and determines if the power of the server needs to be limited or not.

Communication between modules 150-180 may occur bi-directionally. Various policies and control operations may flow from the UCS Manager 150 to CMC 160. CMC 160 distributes the policies to the IMC 170 of a server, and IMC 170 communicates with the BIOS 180 of the server to implement the desired policy. Information regarding the state of each server (e.g., status, compliance with power policies, measurements to determine active power consumption), may be determined at the server level, and flow upwards to CMC 160 and UCS manager 150.

Power Management Policy 130 may include power budgeting information for a group of servers, for a subset of the group of servers, as well as individual servers. Power management policy 130 (e.g., stored on server hardware controller manager 120) may include priority information 132. Priority information 132 may include information regarding the priority of a server. In some approaches, a higher priority may indicate a higher amount of allocated power, as designated by a power budget. For example, if different blades consume different amounts of power, e.g., blade 1 may boot up with 400 W of allocated power and blade 2 may boot up with 250 W of allocated power, then provided that sufficient power is available, blade 1 will be given priority over blade 2. However, if sufficient power is not available to boot up blade 1, blade 2 will be allowed to boot up even if blade 1 has higher priority than blade 2.

Power group 135 may be used to group multiple chassis, and in some instances, multiple servers across multiple chassis, into a single group in order to balance power consumption across a plurality of servers. To create a power group 135, an administrator may create a designated group, add each chassis with corresponding server(s) to the power group, and then assign a budget for the group as a whole. Individual chassis/server budgets may be derived from the group budget set by power measurements, and also may consider the priority 132 of the server. A maximum budget may be included, above which power consumption will not be permitted. A minimum budget may be included below which power consumption cannot be limited.

Figure 2:
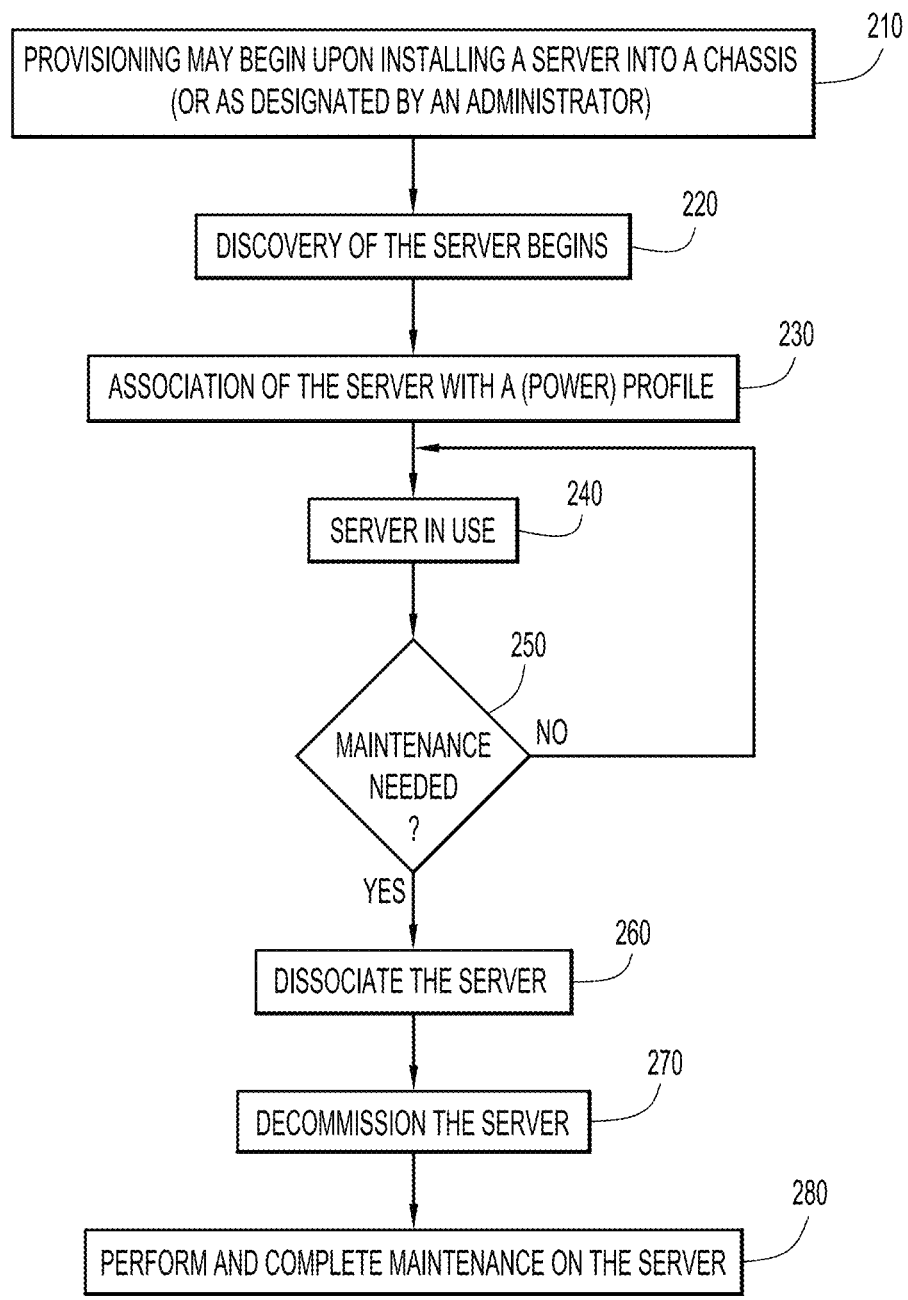
FIG. 2 is a flowchart showing, at a high level, operations involving provisioning of a server, according to an example embodiment.

Referring to FIG. 2, a high level flow diagram of a provisioning flow is shown for UCS Manager 150. At operation 210, provisioning of a server may begin upon installing the server into a chassis. At operation 220, discovery of the server begins. It is noted that, during the discovery process, power limiting does not generally occur, as power measurements and power profiles are being constructed during this process. Additional detail regarding the discovery process is provided herein, e.g., at FIGS. 3A and 3B. At operation 230, the server is associated with a particular power profile, based on the discovery process. At operation 240, the server is fully powered on and ready to use. At operation 250, a determination is made as to whether the server needs to undergo maintenance. If maintenance is not required, the server continues to be operational. If maintenance is required, the server is dissociated from the power group (if applicable), and power profile at operation 260. At operation 270, the server is decommissioned; and at operation 280, server maintenance is performed and completed. Once repairs have been completed, the server may again progress through the provisioning process, beginning at operation 210.

Figure 3A:
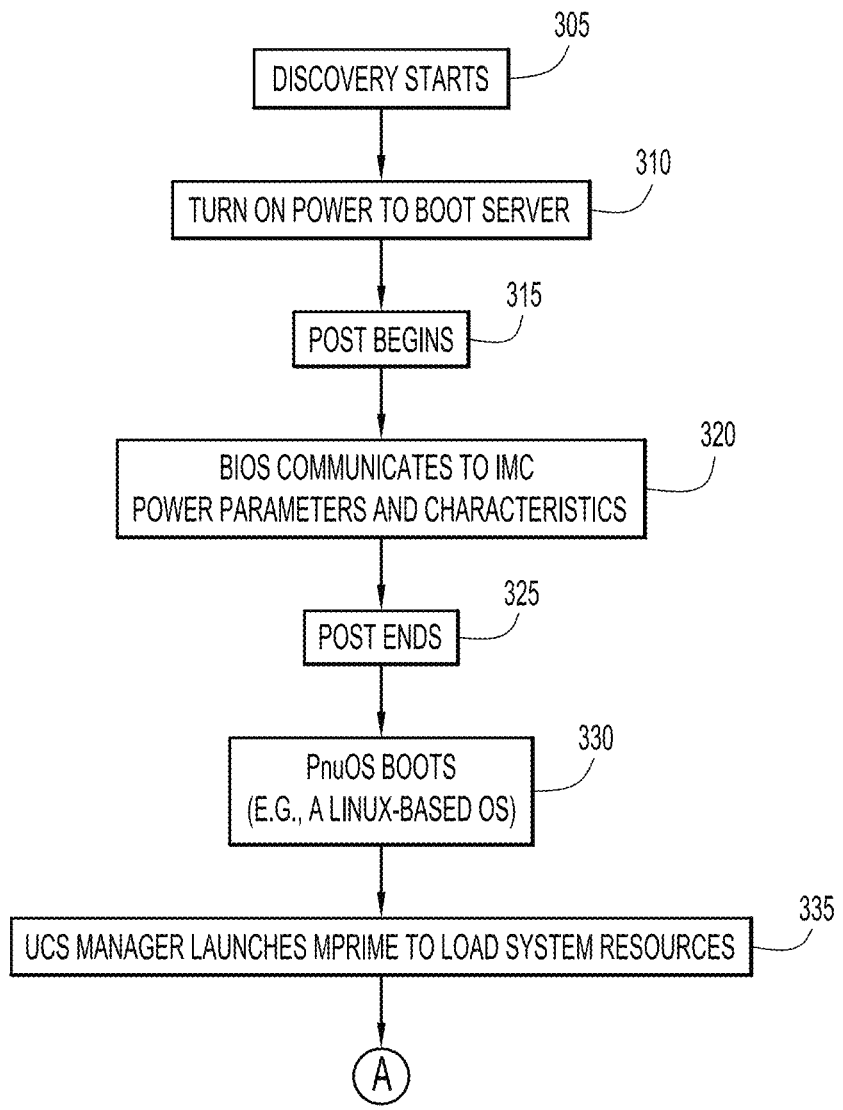
FIGS. 3A and 3B are flowcharts showing the discovery portion of the provisioning process of FIG. 2 in additional detail, according to an example embodiment.
Figure 3B:
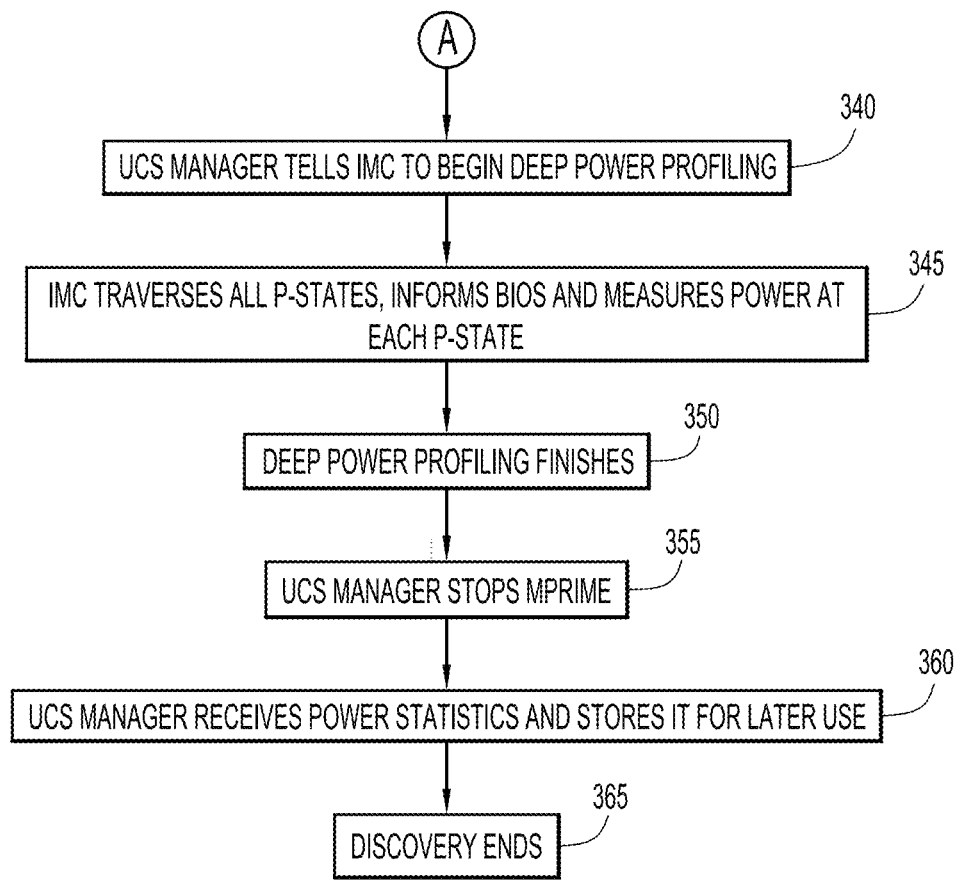

FIGS. 3A and 3B show an example flowchart of a discovery operation 220 in additional detail. At operation 305, the discovery process begins. At operation 310, the server is powered on to boot up the server. When a server initially powers on, the CPUs are placed in the lowest power consuming P-state.

At operation 315, POST begins. At operation 320 (during POST), the BIOS communicates various power parameters and platform characteristics to the IMC. During this stage, the BIOS may collect information on various performance states from the server processor and communicate this information to the IMC. For example, minimum power consumption state and maximum power consumption state during POST may be determined and provided to the IMC. The minimum power consumption found during this phase of POST would be the absolute minimum (floor) beneath which the power cannot be capped during POST. The maximum power consumption would be the maximum power consumed during POST. During this phase, a BIOS System Management Interrupt (SMI) handler will be installed during early stages of POST. At operation 325, POST concludes.

At operation 330, an operating system (e.g., a processor node utility operating system (PnuOS), which may be Linux-based), boots up. It is noted that other suitable operating systems may be used as well. At operation 335, UCS Manager launches MPRIME, a software program used to perform Deep Power Profile Discovery (DPPD), to load up system resources. The process of DPPD is used to determine a power profile at each P-state, as described in additional detail herein. It is noted that before the UCS Manager begins running MPRIME in PnuOS, UCS Manager may gather information from the IMC regarding execution of the power profiling algorithm, with such information including length of time to perform the measurements, how long to conduct each performance state test, etc.

At operation 340, the UCS Manager tells the IMC to begin DPPD. It is noted that any suitable software program for performing DPPD may be employed.

DPPD, when initiated by UCS Manager, may instruct the IMC to determine the maximum power consumption at each P-state. Performance states (or P-states) are CPU performance states of the processor. In other words, P-states correspond to voltage and frequency operating points. Changing the P-state modifies the processor's core frequency and operating voltage, thereby altering power consumption. In general, P0 is the highest frequency state and corresponds to the highest power consumption. Pn (e.g., n=16) may be the lowest frequency state and corresponds to the lowest power consumption.

At operation 345, the IMC traverses all P-states, measuring maximum power consumption (worst case power consumption) at each P-state (e.g., P0, P1, . . . , Pn). For example, to determine the worst case power consumption at the lowest P-state Pn, the server may be placed in the lowest P-state with all adjustable parameters set to values that maximize power consumption. Adjustable parameters, e.g., hyper-threading, turbo mode, or BIOS settings in general, which impact power consumption, need to be determined prior to the host operating system booting, and in general, cannot be changed dynamically.

It is noted that a power budget may not be set below a minimum power consumption, which is an absolute floor beneath which the IMC cannot control. For example, if a budget is set to a value at or below this minimum, the power of the server starts to go above the budget, the IMC will have to go into a "catastrophic" state, and will result in the IMC powering off the host. Therefore, to determine minimum power consumption, the CPU(s) are placed in the slowest P-state (i.e. highest P-state number Pn), and each CPU is set to consume as much power as possible.

As an example of power profiling (DPPD), the IMC may start at the highest P-state P0 (corresponding to the highest CPU frequency of a processor, where n is a positive integer), and every 10 seconds (an example of a sample time needed to make the P-state measurement), the P-state is decremented until reaching the slowest P-state Pn). Thus, depending upon the number of possible P-states for the CPU, it would take n×10 seconds to perform DPPD. At the end of each 10 second increment, the IMC records the maximum power consumption found, scales the factor by 15-20% to account for inaccuracies and provides a buffer for realistic worst case measurements, and then decrements the P-state to P1. It is noted that scaling may be performed to speed up the process of power profiling, rather than collecting information at each state for extended periods of time. In other examples, DPPD may begin at the lowest P-state and increment the P-state as a function of time.

Performing DPPD provides an optimized and accurate profile, allowing for fine tuning of power consumption. The information obtained from DPPD will determine the absolute minimal power budget that a user can set on a per server basis during normal OS operations.

At 350, IMC completes DPPD; and MPRIME is stopped by the UCS Manager at operation 355. At operation 360, the UCSM obtains the collected power statistics of the various P-states and stores this information for subsequent use. At operation 365, the discovery process is complete.

Thus, a maximum power consumption at P0 state as well as a minimum power consumption at the lowest P-state Pn is determined during the power profile process, with each measurement being conducted under worst case conditions.

Figure 4A:
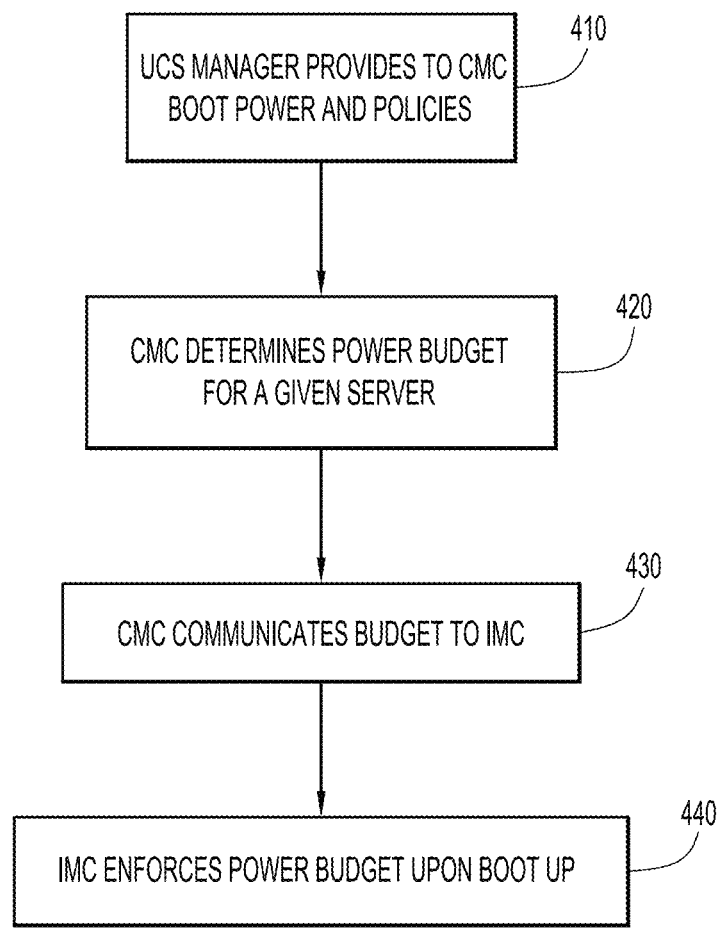
FIG. 4A is a flowchart showing, at a high level, configuring a power budget for a server, according to an example embodiment.
Figure 4B:
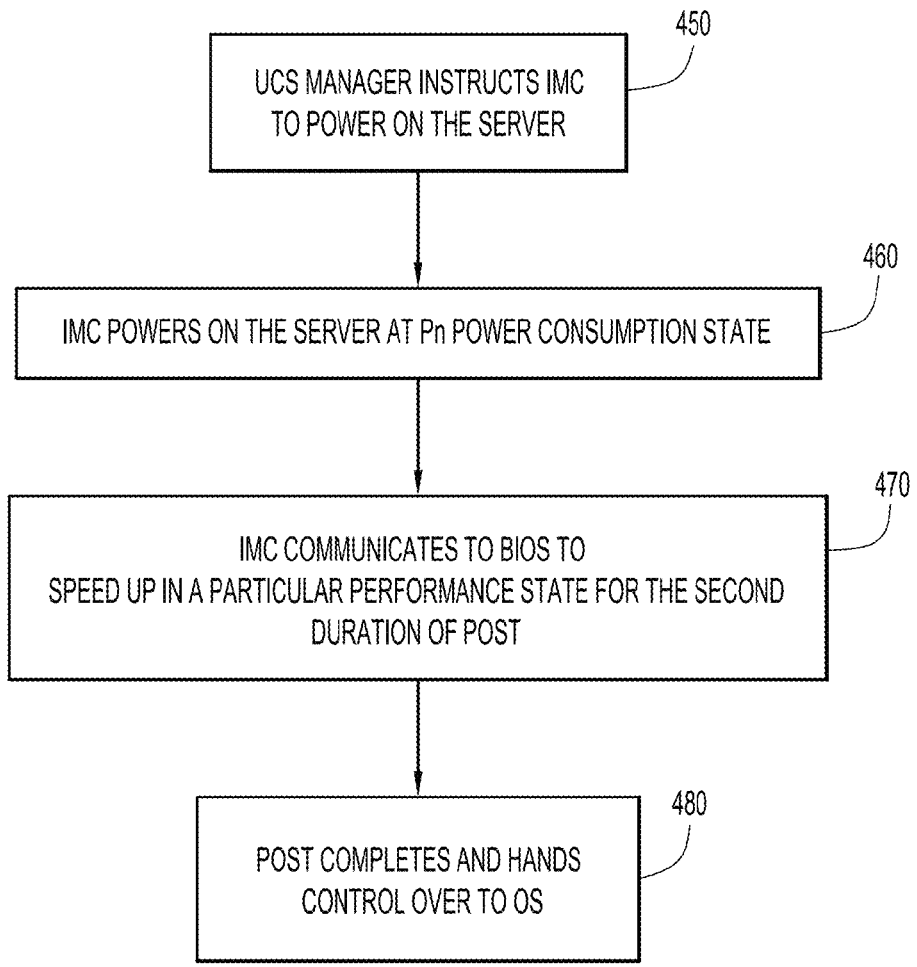
FIG. 4B is a flowchart showing an example of limiting power consumption during a server reboot, according to an example embodiment.

FIGS. 4A and 4B are example flowcharts showing power limiting during a reboot event. It is noted that BIOS POST power capping is performed after discovery completes, and not during a discovery boot. FIG. 4A shows an example of how policies (e.g., power budgets, etc.) may be distributed to the IMC to enforce a power budget during boot up. FIG. 4B shows power management of a server undergoing a reboot.

Referring to FIG. 4A, at operation 410, UCS Manager provides boot power and policies to the CMC. At 420, the CMC determines a power budget for a given server. At 430, the CMC communicates the power budget to the IMC. At 440, the IMC enforces the power budget upon boot up.

In FIG. 4B, at operation 450, the UCS Manager instructs the IMC to power on the server. At 460, the IMC powers on the server at the lowest power consumption state Pn.

During a reboot event, the server may boot up in its highest P-state (minimum power consumption) until an SMI handler is installed, usually early in POST. The SMI handler installation point divides POST into two time periods; the power consumed in the period before the SMI handler is installed is not controllable, while the power consumed in the period after the SMI handler is installed is controllable. Slightly prior to this time, the BIOS may query the IMC to determine if the remainder of POST needs to be limited. The IMC may make this designation based upon the power budget (e.g., current allocated power) and profiled maximum power consumption, as determined during operation 320, during POST. The IMC may inform the BIOS that it can operate faster, and how much faster depends on allocated power budget and server power profile. Thus, the BIOS may speed up during the second stage of POST, based upon instructions from the IMC. (It is noted that the fastest speed through POST will be achieved with uncapped power consumption.) If the power budget is less than the profiled maximum power consumption during POST, power supplied to POST should be limited and an appropriate P-state should be selected. Otherwise, POST may proceed as usual.

In some approaches, interrupt handlers, e.g., a SMI handler or System Configuration Interrupt (SCI) handler, may be used to notify an operating system that the power management policy has been changed. For example, a power capping request signal from the IMC will trigger a BIOS SMI or SCI interrupt depending on server chipset configuration. The SMI or SCI handler will read all information that the IMC has provided and will implement processes to configure CPU P-states accordingly.

At 470, the IMC sends instructions to the BIOS to be in a particular P-state for the remaining duration of POST (e.g., to limit power consumption, etc.). The IMC may deliver the target P-state based on a normalized P-state table (as described in additional detail below in conjunction with FIG. 6), the maximum power consumption profiled during POST, and the power budget. Thus, instead of reallocating power, especially if none is available, the techniques disclosed herein may be used to reduce power consumption (as compared to P-state P0) in order to meet a specified power budget.

It is also noted that because SMI is a highest privilege interrupt, this will interrupt the BIOS POST code execution flow to power limit POST. Once the BIOS receives the target P-state, it will change all processor states to the targeted P-state regardless of the POST phase. Depending on the P-state, the state may or may not significantly impact the time that it takes to boot-up. When possible, smallest possible P-states (maximum possible performance) within a specified power budget will be chosen so as to minimally impact boot-up operations.

At 480, POST completes and hands control over to the OS. IMC may report power consumption statistics to the CMC, which are then provided to the UCS Manager. The UCS Manager may then utilize this information for power allocation and budgeting.

FIG. 5 provides an example of a P-state table for a series of Intel® processors. At 510, various P-states are shown, e.g., P1-P14. At 520 and 530, corresponding frequency and power usages, for each P-state are shown. As an example, for P1, the processor operates at a frequency of 3.33 GHz and consumes 130 W of power. During DPPD, the processor may progress through each P-state and corresponding worst case power may be measured.

FIG. 6 provides an example of a normalized P-state table. The normalized P-state table represents the maximum power consumption of a server at a given P-state relative to the maximum power consumption (e.g., operating at the maximum frequency P0). Thus, P0 and P1 correspond to 100% of maximum power consumption (e.g., 130 W), while P14 corresponds to 50% of maximum power consumption (e.g., 65 W) for a given processor.

Thus, the normalized P-state table may be used to map P-states (as measured during normal system operation) to P-states during POST. As an example, if maximum power during POST was measured to be 130 W, and the power budget was now set to be 100 W, then a normalized P-state corresponding to about 77% (or below) of maximum operating power may be selected. Thus, any of P-states P7-P14 may be selected to meet the specified power budget.

If host-side operations are computationally expensive, and the server is constrained to its lowest P-state, the server cannot consume less than 50% of maximum. Thus, the UCS Manager does not allow the user to specify any power budget less than 50% of its potential maximum.

Figure 7:
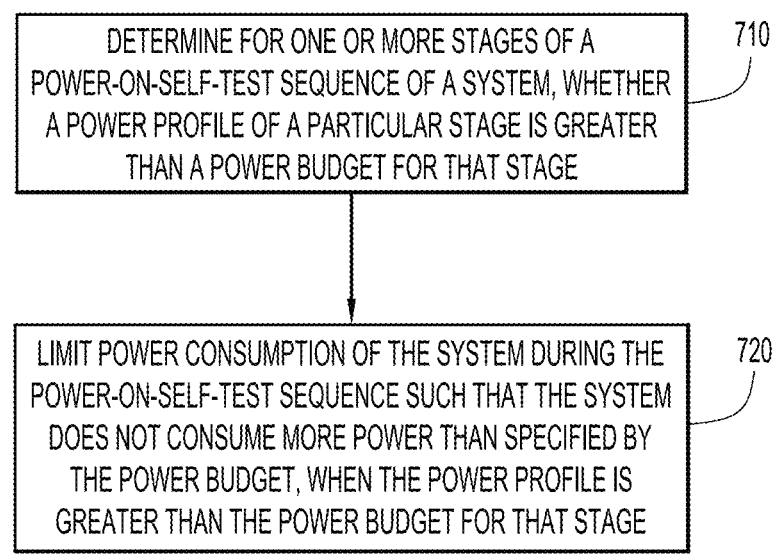
FIG. 7 is a flowchart generally depicting operations of a power manager, according to an example embodiment.

FIG. 7 shows a high-level/generalized flowchart depicting operations performed by an IMC in accordance with the techniques presented herein. At operation 710, for one or more stages of a power-on-self-test sequence of a system, it is determined whether a power profile of a particular stage is greater than a power budget for that stage. At operation 720, power consumption of the system during the power-on-self-test sequence is limited such that the system does not consume more power than specified by the power budget, when the power profile is greater than the power budget for that stage.

Figure 8:
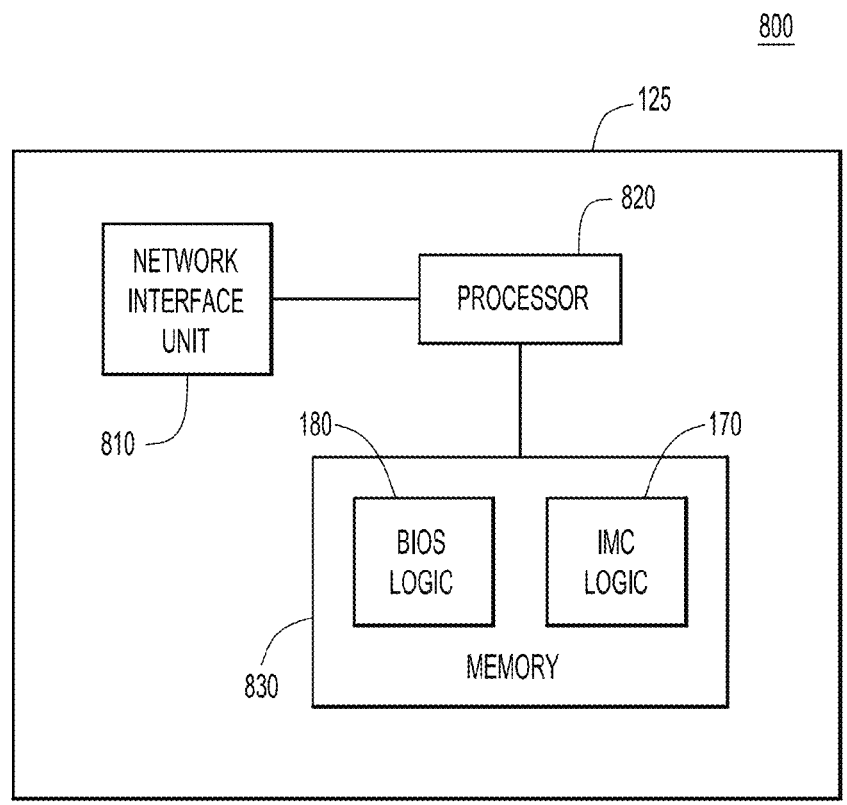
FIG. 8 is a block diagram of an example of a power manager, according to an example embodiment.

FIG. 8 illustrates an example block diagram of a server 125 (e.g., any of 125(1)-125(N)) configured to perform the operations presented herein. The server 125 includes a network interface unit 810, a processor 820, and a memory 830. The network interface unit 810 is configured to enable network communications over a network to send or receive traffic flows between e.g., local area networks and wide area networks.

The processor 820 may be embodied by one or more microprocessors or microcontrollers, and executes software instructions stored in memory 830 for IMC logic 170 and BIOS logic 180, to perform the operations described above in connection with FIGS. 1-7.

Memory 830 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 830 may comprise one or more tangible (e.g., non-transitory) computer readable storage media (e.g., a memory device) encoded with software comprising computer executable instructions, and when the software is executed by the processor 820, the processor 820 is operable to perform the operations described herein in connection with IMC logic 170 and BIOS logic 180.

The functions of the processor 820 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

The techniques presented herein provide a computer-implemented method, apparatus and computer readable media (storing processor-executable instructions) for determining for one or more stages of a power-on-self-test sequence of a system, whether a power profile of a particular stage is greater than a power budget for that stage. The power profile specifies a maximum power consumption as determined by the characteristics of the system and the power budget specifies a power consumption currently allocated to the system. When the power profile is greater than the power budget for that stage, power consumption of the system is limited during the power-on-self-test sequence such that the system does not consume more power than specified by the power budget.

Thus in summary, a method is provided comprising: determining for one or more stages of a power-on-self-test sequence of a system, whether a power profile of a particular stage is greater than a power budget for that stage, wherein the power profile specifies a maximum power consumption as determined by the characteristics of the system and the power budget specifies a power consumption currently allocated to the system; and when the power profile is greater than the power budget for that stage, limiting power consumption of the system during the one or more stages of the power-on-self-test sequence such that the system does not consume more power than specified by the power budget.

Similarly, an apparatus is provided comprising: memory configured to store a power profile and a power budget; and a processor coupled to the memory, and configured to: determine for one or more stages of a power-on-self-test sequence of a system, whether a power profile of a particular stage is greater than a power budget for that stage, wherein the power profile specifies a maximum power consumption as determined by the characteristics of the system and the power budget specifies a power consumption currently allocated to the system; and limit, when the power profile is greater than the power budget for that stage, power consumption of the system during the one or more stages of the power-on-self-test sequence such that the system does not consume more power than specified by the power budget.

Likewise, one or more computer-readable storage media are provided encoded with software comprising computer executable instructions and when the software is executed operable to: determine for one or more stages of a power-on-self-test sequence of a system, whether a power profile of a particular stage is greater than a power budget for that stage, wherein the power profile specifies a maximum power consumption as determined by the characteristics of the system and the power budget specifies a power consumption currently allocated to the system; and limit, when the power profile is greater than the power budget for that stage, power consumption of the system during the one or more stages of the power-on-self-test sequence such that the system does not consume more power than specified by the power budget.

The above description is intended by way of example only. Various modifications and structural changes may be made therein without departing from the scope of the concepts described herein and within the scope and range of equivalents of the claims.

What is claimed is:

1. A computer implemented method comprising:
   determining for one or more stages of a power-on-self-test sequence of a system, whether a power profile of a particular stage is greater than a power budget for that stage, wherein the power profile specifies a maximum power consumption as determined by the characteristics of the system and the power budget specifies a power consumption currently allocated to the system; and when the power profile is greater than the power budget for that stage, limiting power consumption of the system during the one or more stages of the power-on-self-test sequence such that the system does not consume more power than specified by the power budget.

2. The method of claim 1, wherein limiting power consumption further comprises utilizing stored performance state information, the performance state information containing power consumption data for each state of a plurality of performance states, and selecting a performance state having a power consumption that is equal to or less than the power budget for that stage.

3. The method of claim 2, further comprising selecting a performance state associated with a lower operating frequency of a central processing unit than an operating frequency currently being utilized by the central processing unit in order to reduce power consumption.

4. The method of claim 2, further comprising determining power characteristics for each state specified in the performance state information occurring during operating system execution, such that the power characteristics correspond to a maximum power consumption for each state.

5. The method of claim 4, further comprising utilizing normalized performance state information, as determined during operating system execution, to reflect a percentage of maximum power consumed for each state; and mapping, using a normalized performance state table, performance state characteristics of power consumption during normal system operation to a corresponding performance state for the power-on-self-test sequence.

6. The method of claim 1, wherein limiting comprises limiting power consumption such that the limited power consumption is greater than a minimum power consumption needed to complete the power-on-self-test sequence.

7. The method of claim 1, wherein limiting comprises limiting power consumption in a manner that minimizes impact to server performance.

8. An apparatus comprising:

memory configured to store a power profile and a power budget; and a processor coupled to the memory, and configured to:

determine for one or more stages of a power-on-self-test sequence of a system, whether a power profile of a particular stage is greater than a power budget for that stage, wherein the power profile specifies a maximum power consumption as determined by the characteristics of the system and the power budget specifies a power consumption currently allocated to the system; and limit, when the power profile is greater than the power budget for that stage, power consumption of the system during the one or more stages of the power-on-self-test sequence such that the system does not consume more power than specified by the power budget.

9. The apparatus of claim 8, wherein the processor is configured to limit power consumption by utilizing performance state information stored as part of the power profile, the performance state information containing power consumption data for each state of a plurality of performance states, and selecting a performance state having a power consumption that is equal to or less than the power budget for that stage.

10. The apparatus of claim 9, wherein the processor is configured to select a performance state associated with a lower operating frequency of a central processing unit than an operating frequency currently being utilized by the central processing unit in order to reduce power consumption.

11. The apparatus of claim 9, wherein the processor is configured to determine power characteristics for each state specified in the performance state information occurring during operating system execution, such that the power characteristics correspond to a maximum power consumption for each state.

12. The apparatus of claim 11, wherein the processor is configured to:

utilize normalized performance state information, as determined during operating system execution, to reflect a percentage of maximum power consumed for each state; and map, using a normalized performance state table, performance state characteristics of power consumption during normal system operation to a corresponding performance state for the power-on-self-test sequence.

13. The apparatus of claim 8, wherein the processor is configured to limit power consumption such that the limited power consumption is greater than a minimum power consumption needed to complete the power-on-self-test sequence.

14. The apparatus of claim 8, wherein the processor is configured to limit power consumption in a manner that minimizes impact to server performance.

15. One or more computer-readable storage media encoded with software comprising computer executable instructions and when the software is executed operable to:

determine for one or more stages of a power-on-self-test sequence of a system, whether a power profile of a particular stage is greater than a power budget for that stage, wherein the power profile specifies a maximum power consumption as determined by the characteristics of the system and the power budget specifies a power consumption currently allocated to the system; and limit, when the power profile is greater than the power budget for that stage, power consumption of the system during the one or more stages of the power-on-self-test sequence such that the system does not consume more power than specified by the power budget.

16. The computer-readable storage media of claim 15, further comprising instructions operable to limit power consumption by utilizing performance state information stored as part of the power profile, the performance state information containing power consumption data for each state of a plurality of performance states, and selecting a performance state having a power consumption that is equal to or less than the power budget for that stage.

17. The computer-readable storage media of claim 16, further comprising instructions operable to select a performance state associated with a lower operating frequency of a central processing unit than an operating frequency currently being utilized by the central processing unit in order to reduce power consumption.

18. The computer-readable storage media of claim 16, further comprising instructions operable to determine power characteristics for each state specified in the performance state information occurring during operating system execution, such that the power characteristics correspond to a maximum power consumption for each state.

19. The computer-readable storage media of claim 18, further comprising instructions operable to:

utilize normalized performance state information, as determined during operating system execution, to reflect a percentage of maximum power consumed for each state; and map, using a normalized performance state table, performance state characteristics of power consumption during normal system operation to a corresponding performance state for the power-on-self-test sequence.

20. The computer-readable storage media of claim 15, further comprising instructions operable to limit power consumption in a manner that minimizes impact to server performance.

\* \* \* \* \*